July 14, 1964  A. TROSS  3,140,762
BRAKE SHOES FOR THE WHEELS OF MOVING VEHICLES
Filed March 27, 1962
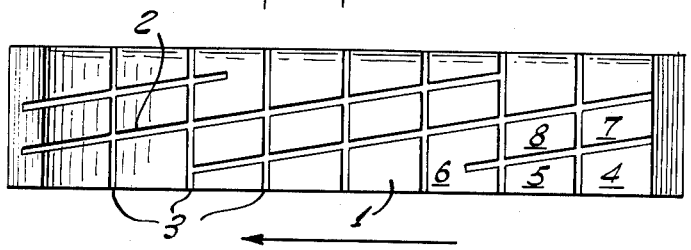
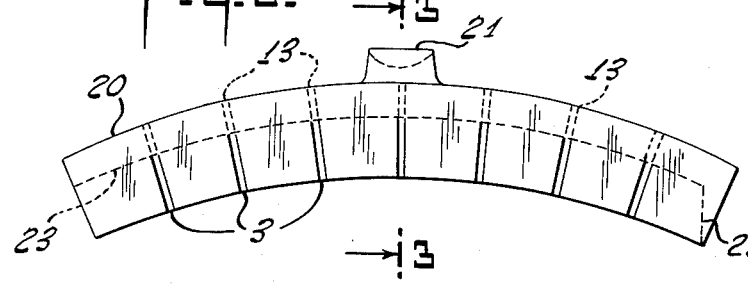
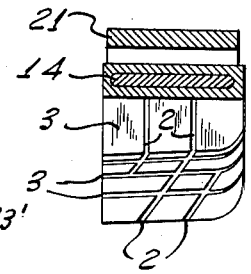
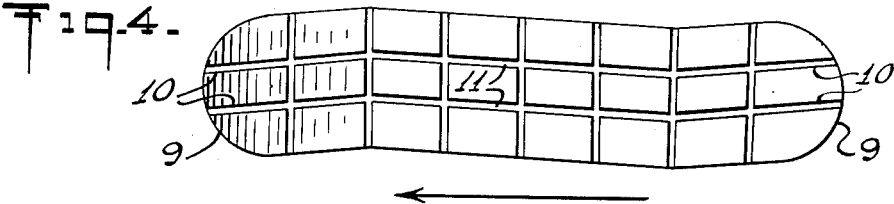
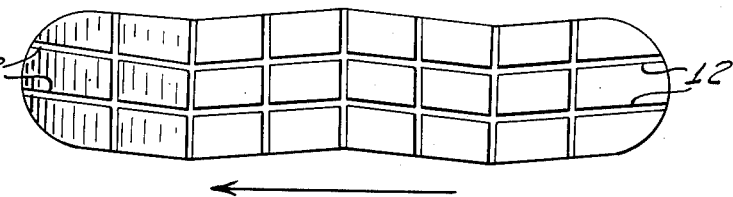
INVENTOR
ARNOLD TROSS United States Patent Office 3,140,762
Patented July 14, 1964

3,140,762
BRAKE SHOES FOR THE WHEELS OF
MOVING VEHICLES
Arnold Tross, Munich, Germany, assignor to Henschel-
Werke G.m.b.H., Kassel, Germany
Filed Mar. 27, 1962, Ser. No. 186,580
4 Claims. (Cl. 188—261)

This invention relates to brake shoes or brake blocks of the kind used for the braking of vehicles, more particularly to improvements in metallic brake shoes or blocks of this kind, whereby their frictional power is increased and their tendency to wear is reduced.

This application is a continuation-in-part of my co-pending application Serial No. 782,300, filed December 22, 1958, now abandoned.

It is known to provide the frictional surfaces of brake shoes or brake blocks with various straight lines or zig-zagging grooves for a variety of purposes, such as for cooling, removal of oil, removal of abraded or trapped foreign particles, and so on.

It is an object of this invention to provide a metallic brake shoe, the contours and braking surface of which are uniquely shaped to provide an improved frictional engagement between the brake shoe and a corresponding surface to be engaged and at the same time reduce the wear of the shoe.

Another object of the invention is to provide a brake shoe, the frictional surface of which is divided into sections so as to cause lateral displacement of the shoe or a section thereof and thus increase the braking effect and decrease grooving and pitting of either of the braking surfaces.

Another object of the invention is to provide a brake shoe, the frictional surface of which is divided into a plurality of sections which can individually expand, independent of the adjoining sections.

Yet another object of the invention is to provide a brake shoe which is adapted to rapidly engage a wheel element with a major portion of its face so as to cause rapid braking action.

In accordance with the invention there is provided an elongated brake shoe adapted to engage a wheel member, which member moves in a direction to be designated as the direction of friction. One groove, or alternatively, a plurality of parallel grooves are provided in the frictional surface of the brake shoe, the depth of the groove or grooves being approximately equal to the normal depth of wear of the shoe. The groove or grooves extend along a direction which is disposed at an oblique angle with respect to the direction of friction, and the groove is disposed along at least a portion of the length of the shoe. Another set of substantially parallel grooves is provided, and the direction of this second set of grooves is transverse to the direction of friction. The oblique grooves and the transverse grooves are disposed at angles substantially oblique to each other.

According to other embodiments of the invention, the plane or planes of the sides of the shoe are inclined relative to the direction of friction either in a simple sloping, or in a zig-zag manner, generally parallel to the oblique groove or grooves, which can also zig-zag instead of extending along a straight line.

A general drawback of prior art brake shoes, having a smooth surface or a surface scored for a variety of other reasons, is that local heating occurs, and a hotter portion of the shoe which wants to expand is wedged between cooler portions thereof, thus creating stresses and strains within the brake shoe, causing warpage of the shoe and plastic deformation of the surface, coupled with a decrease in effective surface and increased rate of wear. This effect is enhanced in monolithic shoes by the stresses created by the second gradients in the direction of the depth of the shoe.

By providing the brake shoes with grooves of the above-mentioned inventive configurations, a multiplicity of beneficial effects can be accomplished over the prior art. Since the grooves penetrate to a considerable depth, i.e. to approximately the same depth as to the depth of expected wear, not only the friction surface but the major portion of the body of the brake shoe becomes subdivided into a plurality of sections. This effect can be better visualized when one realizes that the depth of the grooves in a typical brake shoe of the invention is approximately in the range of $1\tfrac{9}{16}''$ to $2\tfrac{7}{32}''$. Since the body of the brake shoe is thus practically subdivided into almost independent sections, each section can expand independently of the other sections in all directions as the friction heating effect of the braking causes thermal expansion of the thermally independent bodies, whereby a larger contact area is maintained during the braking cycle than in prior art devices, thereby reducing localized wear in the brake shoe and extending its useful life. The longitudinal and transverse elasticity of the brake shoe is also materially increased.

Another beneficial effect that can be accomplished with a brake shoe, according to the invention, is that by subdividing the surface into thermally independent sections, the total area of the brake shoe will come faster into contact with the corresponding surface than in the case of monolithic shoes, resulting in a faster braking action. In the prior art shoes, the locally heated spots make contact first with the corresponding surface and complete contact can be accomplished only when the expanded hot spots wore down by plastic deformation and/or the shoe has warped out of its original shape. This effect is significant since with the increasing speed of modern vehicles the use for faster and more reliable braking action is increased.

In combination with the above-mentioned novel and highly advantageous brake shoe according to the present invention, other advantageous effects can also be accomplished in certain embodiments thereof. The effect of the friction between the individual segments and the braking surface of the wheel results in a lateral movement of the brake shoe, whereby it is assured that a point on the friction surface of the brake shoe is not always in contact with the points of circle in one plane described on the braking surface on the wheel and thus the formation of grooves, nicks, etc. on the braking shoe of the wheel is prevented. Experiments have shown, that the lateral displacement also improves the braking efficiency. Similarly the ejection of abrasive particles between the friction surfaces is also enhanced. This feature also leads to longer and more effective brake life, reduced maintenance and downtime.

Further objects and advantages of the present invention will become apparent from the following detailed description and the accompanying drawings, wherein:

FIG. 1 is a plan view of a brake shoe in accordance with the invention;

FIG. 2 is a side elevational view of the brake shoe illustrated in FIG. 1;

FIG. 3 is a sectional-elevational view taken along line 3—3 of FIG. 2;

FIG. 4 is a plan view of the brake shoe which embodies the invention in another form; and FIG. 5 is a plan view of the brake shoe embodying the invention in yet another form.

In FIGS. 1, 2 and 3 a brake shoe is shown in an embodiment comprising a single homogeneous block of arcuate shape. The brake shoe may be constructed of any suitable material, but the frictional portion of the shoe, shown downward of the dotted longitudinal line 23 in FIG. 2, is of a metallic material, such as cast iron or steel generally used in the brake shoe art. The frictional surface 1 of the brake shoe is subdivided by at least one groove 2 progressing at an angle oblique relative to the leading direction, and a plurality of transverse grooves 3 progressing at an angle substantially normal to the direction of friction. In the embodiment illustrated in the drawing, there is more than one groove 2 provided of the first type, whereby a sub-division of the friction surface of the shoe results into a plurality of sections such as 4–8.

In the preferred embodiment the oblique expansion grooves 2 and the transverse expansion grooves 3 are approximately $\frac{1}{16}$ of an inch to $\frac{7}{32}$ of an inch wide and, as already mentioned, approximately $1\frac{9}{16}$ of an inch to $2\frac{7}{32}$ of an inch deep. The depth of the grooves coincides with the depth of permissible wear and is indicated in FIG. 2 by the dotted line 23. The depth of the grooves is at least twice the width of the sections, such as 4–8, in the transverse direction, but preferably 5–10 times as deep.

A projection 21 is shown to extend from the outer, upper surface of the brake shoe. This extension is integral with the shoe and allows its attachment to the brake actuating mechanism (not shown).

The direction of friction is indicated in the figures by an arrow. Since it is desired that the frictional surface of the shoe heat up rapidly, the oblique slots 2 in the preferred embodiment do not proceed to the end of the shoe, but terminate a short distance within, as shown in FIG. 2 at 23'. This inside termination of the grooves is required only at the leading end, since this is where the rapidly moving member to be braked could drive in cooling air along with it. As shown in FIG. 1, the oblique slots can also be terminated a short distance within the sides, to further prevent the entering of cooling air between the slots.

Thus, it will be seen, particularly from FIGS. 1 and 2, that with the structure of the invention there is provided elongated arcuate brake shoe or friction element, made of a homogeneous metal and having a uniform thickness, and being in the form of an arcuate body or block extending in part around the axis of a cylinder of which the body forms a part. The length of the body or block circumferentially of the cylinder axis is several times as great as the width of the block or body taken parallel to the axis of the cylinder. Furthermore, it will be seen that the transverse grooves 3 extend inwardly from the friction surface 1 transversely across the block parallel to the axis of the cylinder to a depth which is several times as great as the width of the slots 3 taken circumferentially of the axis of the cylinder, and furthermore the elongated grooves 2 extend to the same depth as the grooves 3 and are in the form of spiral grooves which extend helically with respect to the axis of the cylinder.

It is desired that the brake shoe heat up only at its braking surface, but remain relatively cool throughout the monolithic unslotted portion of its body. To that end, ventholes 13 may be provided, the holes being distributed in any desired fashion throughout the area of the shoe. The ventholes 13 connect the bottoms of the grooves wtih the exterior to accomplish the cooling and preserve the strength properties of the parts of the shoe not directly participating in the braking action.

Depending on the number of ventholes 13 and the transverse and oblique grooves, the resulting strength of the congruent part of the brake shoe might not be as great as may be desired. In this case, a steel reinforcing bar 14 may be cast within the congruent, unslotted portion.

Another embodiment of the invention is shown in FIG. 4, where the brake shoe is bounded by approximately semi-circular, parabolic or semi-elliptical ends 9. The form of the shoe is of a zig-zag fashion and the grooves 10, which correspond to the oblique grooves 2 in the previous embodiment, proceed substantially parallel to the zig-zag outline of the shoe. The outline of the shoe and the grooves 10 are at all times disposed at oblique angles with respect to the direction of friction. Reference numeral 11 designates the zagging part of the zig-zagging groove 10. The $3 \times 8 = 24$ segments of the embodiment shown in FIG. 4 are substantially all of similar size.

Another embodiment of the invention is shown in FIG. 5, wherein the embodiment of FIG. 4 is modified to show two halves of a brake shoe disposed in a mirror-image symmetrical relation. Oblique grooves 12 of this embodiment correspond to grooves 10, 11 and 2 of the previous embodiments.

As the braking action begins, the segments towards the leading end of the brake shoe will start to heat up first and according to the invention, the subsequent segments, disposed further toward the direction of friction, will comparatively rapidly heat up, expand and start to contribute to the braking action, thus relieving the initially active segments.

There is a certain optimum size for the area of the individual segments formed, since if they are selected to be too large, the inventive advantages of the brake shoe according to the invention will become lost. If, on the other hand, these areas are too small, the strength of the slotted frictional surface is materially reduced and its rate of wear will increase. In order to avoid thermal stresses and uneven heating of the individual segments, the segment generally is longer towards the direction of friction because this also coincides with the direction of heating. Since the heating in the transverse direction is considerably less, therefore, the segments preferably are selected to be narrower in this direction.

In all of the embodiments shown, the number of the oblique grooves 2, 10, 11 and 12 is determined by the actual width of the braking surface of the wheel, correspondingly the width of the brake shoe; in certain types of vehicles, such as streetcars, this width could be so small that only one oblique groove may be required.

It is to be understood that an expert in the art may undertake certain changes and modifications of the invention without departing from its scope as set forth and to be interpreted from the appended claims.

What I claim is:

1. A friction element comprising a single piece body of a metallic friction material of substantially uniform thickness having an elongated arcuate configuration substantially forming part of a cylinder and having a friction surface adapted for relative movement with a coacting complementary surface of a member whose motion is to be retarded, the length of said body circumferentially of the axis of said cylinder being several times as great as its width parallel to said axis, said friction surface being interrupted by a plurality of transverse grooves parallel to the axis of said cylinder and extending inwardly from said friction surface to a uniform depth several times greater than the width of said grooves taken circumferentially with respect to said axis, said surface being further interrupted by a plurality of substantially parallel spiral grooves extending helically with respect to said axis and inwardly to the same depth as said transverse grooves, the number of spiral grooves being substantially less than the number of transverse grooves, and said spiral and transverse grooves intersecting to form a network dividing said body into a plurality of thermally distinct, separately expandable sections.

2. A brake shoe for contacting and frictionally retarding a rotating wheel, comprising a single homogeneous metal block of elongated arcuate configuration and uniform thickness substantially forming part of a cylinder and having circumferentially of the axis of said cylinder a length several times as great as its width taken parallel to the axis of said cylinder, said block having a friction surface adapted to engage the rotating wheel and said block being formed with a plurality of first grooves extending across said block parallel to said cylinder axis and radially from the friction surface of the block to a depth therein several times the width of said grooves taken circumferentially with respect to said axis, and at least one second groove extending from the friction surface of the block to approximately the same depth as said first grooves, said second groove being disposed helically with respect to said axis and intersecting said first grooves, thereby separating the block into a plurality of substantially thermally independent segments for ensuring that the brake shoe maintain its friction surface during the braking operation substantially in the same shape as before the braking operation.

3. A friction element according to claim 2, wherein a plurality of substantially equally spaced parallel spiral grooves are provided, and the areas of said sections are approximately equal.

4. A friction element according to claim 2, wherein the spiral grooves have sections extending in opposed helical directions to form a zig-zag pattern.

References Cited in the file of this patent

UNITED STATES PATENTS

| | | |
|---|---|---|
| 1,122,583 | Gallagher | Dec. 29, 1914 |
| 2,163,884 | La Brie | June 27, 1939 |
| 2,851,132 | James | Sept. 9, 1958 |
| 2,921,651 | Myers | Jan. 19, 1960 |